United States Patent
Rajaram et al.

(10) Patent No.: US 10,005,075 B2
(45) Date of Patent: *Jun. 26, 2018

(54) PASSIVE NO$_x$ ADSORBER

(71) Applicant: Johnson Matthey Public Limited Company, London (GB)

(72) Inventors: Raj Rao Rajaram, Slough (GB); Hai-Ying Chen, Conshohocken, PA (US); Dongxia Liu, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/563,340

(22) Filed: Dec. 8, 2014

(65) Prior Publication Data

US 2015/0158019 A1    Jun. 11, 2015

Related U.S. Application Data

(60) Provisional application No. 61/912,834, filed on Dec. 6, 2013.

(51) Int. Cl.
| | |
|---|---|
| *B01D 53/94* | (2006.01) |
| *B01J 29/44* | (2006.01) |
| *B01J 29/74* | (2006.01) |
| *F01N 3/08* | (2006.01) |
| *B01J 37/02* | (2006.01) |
| *B01J 29/83* | (2006.01) |
| *B01J 29/84* | (2006.01) |
| *B01J 29/85* | (2006.01) |
| *B01J 35/04* | (2006.01) |
| *B01J 20/18* | (2006.01) |
| *B01J 20/32* | (2006.01) |
| *B01J 20/28* | (2006.01) |
| *B01J 29/80* | (2006.01) |

(52) U.S. Cl.
CPC ........ *B01J 29/743* (2013.01); *B01D 53/9481* (2013.01); *B01J 20/186* (2013.01); *B01J 20/28045* (2013.01); *B01J 20/3204* (2013.01); *B01J 20/3238* (2013.01); *B01J 29/44* (2013.01); *B01J 29/74* (2013.01); *B01J 29/7415* (2013.01); *B01J 29/83* (2013.01); *B01J 29/84* (2013.01); *B01J 29/85* (2013.01); *B01J 35/04* (2013.01); *B01J 37/0246* (2013.01); *F01N 3/0814* (2013.01); *F01N 3/0821* (2013.01); *B01D 2253/108* (2013.01); *B01D 2253/1122* (2013.01); *B01D 2255/1023* (2013.01); *B01D 2255/50* (2013.01); *B01D 2255/91* (2013.01); *B01J 29/80* (2013.01); *B01J 2229/186* (2013.01); *B01J 2229/36* (2013.01); *Y02T 10/22* (2013.01)

(58) Field of Classification Search
CPC ... B01D 53/9418; B01J 29/70; B01J 29/7015; B01J 29/74; B01J 29/743; F01N 3/0842
See application file for complete search history.

(56) References Cited

U.S. PATENT DOCUMENTS

| | | | |
|---|---|---|---|
| RE34,804 E | 12/1994 | Lachman et al. | |
| 5,492,883 A | 2/1996 | Wu | |
| 5,565,394 A | 10/1996 | Lachman et al. | |
| 5,633,217 A | 5/1997 | Lynn | |
| 5,656,244 A | 8/1997 | Cole | |
| 9,114,376 B2 * | 8/2015 | Fedeyko | B01J 29/74 |
| 9,162,218 B2 * | 10/2015 | Bull | B01D 53/9418 |
| 2003/0115859 A1 | 6/2003 | Deeba | |
| 2010/0267548 A1 | 10/2010 | Andersen et al. | |
| 2011/0005200 A1 | 1/2011 | Gandhi et al. | |
| 2012/0308439 A1 | 12/2012 | Chen et al. | |

FOREIGN PATENT DOCUMENTS

| | | |
|---|---|---|
| EP | 0935055 A2 | 8/1999 |
| EP | 1027919 A2 | 8/2000 |
| EP | 1184556 A2 | 3/2002 |
| WO | 2004076829 A1 | 9/2004 |
| WO | 2008047170 A1 | 4/2008 |
| WO | 2011112949 A1 | 9/2011 |
| WO | 2012166868 A1 | 12/2012 |
| WO | 2012170421 A1 | 12/2012 |

\* cited by examiner

*Primary Examiner* — Timothy C Vanoy
(74) *Attorney, Agent, or Firm* — Jimmie D. Johnson

(57) ABSTRACT

A passive NO$_x$ adsorber is disclosed. The passive NO$_x$ adsorber is effective to adsorb NO$_x$ at or below a low temperature and release the adsorbed NO$_x$ at temperatures above the low temperature. The passive NO$_x$ adsorber comprises a noble metal and a small pore molecular sieve. The small pore molecular sieve has a maximum ring size of eight tetrahedral atoms. The invention also includes an exhaust system comprising the passive NO$_x$ adsorber, and a method for treating exhaust gas from an internal combustion engine utilizing the passive NO$_x$ adsorber.

15 Claims, No Drawings

PASSIVE NO$_x$ ADSORBER

CROSS-REFERENCE TO RELATED APPLICATIONS

This application is claims priority benefit of U.S. Provisional Patent Application No. 61/912,384 filed Dec. 6, 2013, the disclosures of which are incorporated herein by reference in their entireties for all purposes.

FIELD OF THE INVENTION

The invention relates to a passive NO$_x$ adsorber and its use in an exhaust system for internal combustion engines.

BACKGROUND OF THE INVENTION

Internal combustion engines produce exhaust gases containing a variety of pollutants, including nitrogen oxides ("NO$_x$"), carbon monoxide, and uncombusted hydrocarbons, which are the subject of governmental legislation. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

For instance, current urea based selective catalytic reduction (SCR) applications implemented for meeting Euro 6b emissions require that the temperature at the urea dosing position be above about 180° C. before urea can be dosed and used to convert NO$_x$. NO$_x$ conversion below 180° C. is difficult to address using the current systems, and future European and US legislation will stress the low temperature NO$_x$ storage and conversion. Currently this is achieved by heating strategies but this has a detrimental effect of CO$_2$ emissions.

As even more stringent national and regional legislation lowers the amount of pollutants that can be emitted from diesel or gasoline engines, reducing emissions during the cold start period is becoming a major challenge. Thus, methods for reducing the level of NO$_x$ emitted during cold start condition continue to be explored.

For instance, PCT Intl. Appl. WO 2008/047170 discloses a system wherein NO$_x$ from a lean exhaust gas is adsorbed at temperatures below 200° C. and is subsequently thermally desorbed above 200° C. The NO$_x$ adsorbent is taught to consist of palladium and a cerium oxide or a mixed oxide or composite oxide containing cerium and at least one other transition metal.

U.S. Appl. Pub. No. 2011/0005200 teaches a catalyst system that simultaneously removes ammonia and enhances net NO conversion by placing an ammonia-selective catalytic reduction ("NH$_3$—SCR") catalyst formulation downstream of a lean NO trap. The NH$_3$—SCR catalyst is taught to adsorb the ammonia that is generated during the rich pulses in the lean NO trap. The stored ammonia then reacts with the NO emitted from the upstream lean NO trap, which increases NO conversion rate while depleting the stored ammonia.

PCT Intl. Appl. WO 2004/076829 discloses an exhaust-gas purification system which includes a NO storage catalyst arranged upstream of an SCR catalyst. The NO storage catalyst includes at least one alkali, alkaline earth, or rare earth metal which is coated or activated with at least one platinum group metal (Pt, Pd, Rh, or Ir). A particularly preferred NO storage catalyst is taught to include cerium oxide coated with platinum and additionally platinum as an oxidizing catalyst on a support based on aluminum oxide. EP 1027919 discloses a NO adsorbent material that comprises a porous support material, such as alumina, zeolite, zirconia, titania, and/or lanthana, and at least 0.1 wt % precious metal (Pt, Pd, and/or Rh). Platinum carried on alumina is exemplified. U.S. Appl. Pub. No. 2012/0308439 A1 teaches a cold start catalyst that comprises (1) a zeolite catalyst comprising a base metal, a noble metal, and a zeolite, and (2) a supported platinum group metal catalyst comprising one or more platinum group metals and one or more inorganic oxide carriers.

As with any automotive system and process, it is desirable to attain still further improvements in exhaust gas treatment systems, particularly under cold start conditions. We have discovered a new passive NO$_x$ adsorber that provides enhanced cleaning of the exhaust gases from internal combustion engines. The new passive NO$_x$ adsorber also exhibits improved sulfur tolerance.

SUMMARY OF THE INVENTION

The invention is a passive NO$_x$ adsorber that is effective to adsorb NO$_x$ at or below a low temperature and release the adsorbed NO$_x$ at temperatures above the low temperature. The passive NO$_x$ adsorber comprises a noble metal and a small pore molecular sieve. The small pore molecular sieve has a maximum ring size of eight tetrahedral atoms. The invention also includes an exhaust system comprising the passive NO$_x$ adsorber, and a method for treating exhaust gas from an internal combustion engine utilizing the passive NO$_x$ adsorber.

DETAILED DESCRIPTION OF THE INVENTION

The passive NO$_x$ adsorber of the invention is effective to adsorb NO$_x$ at or below a low temperature and release the adsorbed NO$_x$ at temperatures above the low temperature. Preferably, the low temperature is about 200° C. The passive NO$_x$ adsorber comprises a noble metal and a small pore molecular sieve. The noble metal is preferably palladium, platinum, rhodium, gold, silver, iridium, ruthenium, osmium, or mixtures thereof; more preferably, palladium, platinum, rhodium, or mixtures thereof. Palladium is particularly preferred.

The small pore molecular sieve has a maximum ring size of eight tetrahedral atoms. The small pore molecular sieve may be any natural or a synthetic molecular sieve, including zeolites, and is preferably composed of aluminum, silicon, and/or phosphorus. The molecular sieves typically have a three-dimensional arrangement of SiO$_4$, AlO$_4$, and/or PO$_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons. Other metals (e.g., Fe, Ti, and Ga) may be incorporated into the framework of the small pore molecular sieve to produce a metal-incorporated molecular sieve.

Preferably, the small pore molecular sieve is selected from an aluminosilicate molecular sieve, a metal-substituted aluminosilicate molecular sieve, an aluminophosphate molecular sieve, or a metal-substituted aluminophosphate molecular sieve. More preferably, the small pore molecular sieve is a molecular sieve having the Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, as well as mixtures or intergrowths of any two or more. Particularly preferred intergrowths of the small pore molecular sieves include KFI-SIV, ITE-RTH, AEW-UEI, AEI-CHA, and AEI-SAV. Most preferably, the small pore molecular sieve is AEI or CHA, or an AEI-CHA intergrowth.

The passive $NO_x$ adsorber may be prepared by any known means. For instance, the noble metal may be added to the small pore molecular sieve to form the passive $NO_x$ adsorber by any known means, the manner of addition is not considered to be particularly critical. For example, a noble metal compound (such as palladium nitrate) may be supported on the molecular sieve by impregnation, adsorption, ion-exchange, incipient wetness, precipitation, or the like. Other metals may also be added to the passive $NO_x$ adsorber.

Preferably, some of the noble metal (more than 1 percent of the total noble metal added) in the passive $NO_x$ adsorber is located inside the pores of the small pore molecular sieve. More preferably, more than 5 percent of the total amount of noble metal is located inside the pores of the small pore molecular sieve; and even more preferably may be greater than 10 percent or greater than 25% or greater than 50 percent of the total amount of noble metal that is located inside the pores of the small pore molecular sieve.

Preferably, the passive $NO_x$ adsorber further comprises a flow-through substrate or filter substrate. In one embodiment, the passive $NO_x$ adsorber is coated onto the flow-through or filter substrate, and preferably deposited on the flow-through or filter substrate using a washcoat procedure to produce a passive $NO_x$ adsorber system.

The flow-through or filter substrate is a substrate that is capable of containing catalyst components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The passive $NO_x$ adsorber may be added to the flow-through or filter substrate by any known means. A representative process for preparing the passive $NO_x$ adsorber using a washcoat procedure is set forth below. It will be understood that the process below can be varied according to different embodiments of the invention.

The pre-formed passive $NO_x$ adsorber may be added to the flow-through or filter substrate by a washcoating step. Alternatively, the passive $NO_x$ adsorber may be formed on the flow-through or filter substrate by first washcoating unmodified small pore molecular sieve onto the substrate to produce a molecular sieve-coated substrate. Noble metal may then be added to the molecular sieve-coated substrate, which may be accomplished by an impregnation procedure, or the like.

The washcoating procedure is preferably performed by first slurrying finely divided particles of the passive $NO_x$ adsorber (or unmodified small pore molecular sieve) in an appropriate solvent, preferably water, to form the slurry. Additional components, such as transition metal oxides, binders, stabilizers, or promoters may also be incorporated in the slurry as a mixture of water soluble or water-dispersible compounds. The slurry preferably contains between 10 to 70 weight percent solids, more preferably between 20 to 50 weight percent. Prior to forming the slurry, the passive $NO_x$ adsorber (or unmodified small pore molecular sieve) particles are preferably subject to a size reduction treatment (e.g., milling) such that the average particle size of the solid particles is less than 20 microns in diameter.

The flow-through or filter substrate may then be dipped one or more times into the slurry or the slurry may be coated on the substrate such that there will be deposited on the substrate the desired loading of catalytic materials. If noble metal is not incorporated into the molecular sieve prior to washcoating the flow-through or filter substrate, the molecular sieve-coated substrate is typically dried and calcined and then, the noble metal may be added to the molecular sieve-coated substrate by any known means, including impregnation, adsorption, or ion-exchange, for example, with a noble metal compound (such as palladium nitrate). Preferably, the entire length of the flow-through or filter substrate is coated with the slurry so that a washcoat of the passive $NO_x$ adsorber covers the entire surface of the substrate.

After the flow-through or filter substrate has been coated with the passive $NO_x$ adsorber, and impregnated with noble metal if necessary, the coated substrate is preferably dried and then calcined by heating at an elevated temperature to form the passive $NO_x$ adsorber-coated substrate. Preferably, the calcination occurs at 400 to 600° C. for approximately 1 to 8 hours.

In an alternative embodiment, the flow-through or filter substrate is comprised of the passive $NO_x$ adsorber. In this case, the passive $NO_x$ adsorber is extruded to form the flow-through or filter substrate. The passive $NO_x$ adsorber extruded substrate is preferably a honeycomb flow-through monolith.

Extruded molecular sieve substrates and honeycomb bodies, and processes for making them, are known in the art. See, for example, U.S. Pat. Nos. 5,492,883, 5,565,394, and 5,633,217 and U.S. Pat. No. Re. 34,804. Typically, the molecular sieve material is mixed with a permanent binder such as silicone resin and a temporary binder such as methylcellulose, and the mixture is extruded to form a green honeycomb body, which is then calcined and sintered to form the final small pore molecular sieve flow-through monolith. The molecular sieve may contain the noble metal prior to extruding such that a passive $NO_x$ adsorber monolith is produced by the extrusion procedure. Alternatively, the noble metal may be added to a pre-formed molecular sieve monolith in order to produce the passive $NO_x$ adsorber monolith.

The invention also includes an exhaust system for internal combustion engines comprising the passive $NO_x$ adsorber. The exhaust system preferably comprises one or more additional after-treatment devices capable of removing pollutants from internal combustion engine exhaust gases at normal operating temperatures. Preferably, the exhaust system comprises the passive $NO_x$ adsorber and one or more other catalyst components selected from: (1) a selective catalytic reduction (SCR) catalyst, (2) a particulate filter, (3) a SCR filter, (4) a $NO_x$ adsorber catalyst, (5) a three-way catalyst, (6) an oxidation catalyst, or any combination thereof. The passive $NO_x$ adsorber is preferably a separate component from any of the above after-treatment devices. Alternatively, the passive $NO_x$ adsorber can be incorporated as a component into any of the above after-treatment devices.

These after-treatment devices are well known in the art. Selective catalytic reduction (SCR) catalysts are catalysts that reduce $NO_x$ to $N_2$ by reaction with nitrogen compounds (such as ammonia or urea) or hydrocarbons (lean $NO_x$ reduction). A typical SCR catalyst is comprised of a vanadia-titania catalyst, a vanadia-tungsta-titania catalyst, or a metal/zeolite catalyst such as iron/beta zeolite, copper/beta zeolite, copper/SSZ-13, copper/SAPO-34, Fe/ZSM-5, or copper/ZSM-5.

Particulate filters are devices that reduce particulates from the exhaust of internal combustion engines. Particulate filters include catalyzed particulate filters and bare (non-catalyzed) particulate filters. Catalyzed particulate filters (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Selective catalytic reduction filters (SCRF) are single-substrate devices that combine the functionality of an SCR and a particulate filter. They are used to reduce $NO_x$ and particulate emissions from internal combustion engines. In addition to the SCR catalyst coating, the particulate filter may also include other metal and metal oxide components (such as Pt, Pd, Fe, Mn, Cu, and ceria) to oxidize hydrocarbons and carbon monoxide in addition to destroying soot trapped by the filter.

$NO_x$ adsorber catalysts (NACs) are designed to adsorb $NO_x$ under lean exhaust conditions, release the adsorbed $NO_x$ under rich conditions, and reduce the released $NO_x$ to form $N_2$. NACs typically include a $NO_x$-storage component (e.g., Ba, Ca, Sr, Mg, K, Na, Li, Cs, La, Y, Pr, and Nd), an oxidation component (preferably Pt) and a reduction component (preferably Rh). These components are contained on one or more supports.

Three-way catalysts (TWCs) are typically used in gasoline engines under stoichiometric conditions in order to convert $NO_x$ to $N_2$, carbon monoxide to $CO_2$, and hydrocarbons to $CO_2$ and $H_2O$ on a single device.

Oxidation catalysts, and in particular diesel oxidation catalysts (DOCS), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

The exhaust system can be configured so that the passive $NO_x$ adsorber is located close to the engine and the additional after-treatment device(s) are located downstream of the passive $NO_x$ adsorber. Thus, under normal operating conditions, engine exhaust gas first flows through the passive $NO_x$ adsorber prior to contacting the after-treatment device(s). Alternatively, the exhaust system may contain valves or other gas-directing means such that during the low temperature period (below a temperature ranging from about 150 to 220° C., preferably 200° C., about as measured at the after-treatment device(s)), the exhaust gas is directed to contact the after-treatment device(s) before flowing to the passive $NO_x$ adsorber. Once the after-treatment device(s) reaches the operating temperature (about 150 to 220° C., preferably 200° C., as measured at the after-treatment device(s)), the exhaust gas flow is then redirected to contact the passive $NO_x$ adsorber prior to contacting the after-treatment device(s). This ensures that the temperature of the passive $NO_x$ adsorber remains low for a longer period of time, and thus improves efficiency of the passive $NO_x$ adsorber, while simultaneously allowing the after-treatment device(s) to more quickly reach operating temperature. U.S. Pat. No. 5,656,244, the teachings of which are incorporated herein by reference, for example, teaches means for controlling the flow of the exhaust gas during cold-start and normal operating conditions.

The invention also includes a method for treating exhaust gas from an internal combustion engine. The method comprises adsorbing $NO_x$ onto the passive $NO_x$ adsorber at temperatures at or below a low temperature, thermally desorbing $NO_x$ from the passive $NO_x$ adsorber at a temperature above the low temperature, and catalytically removing the desorbed $NO_x$ on a catalyst component downstream of the passive $NO_x$ adsorber. Preferably, the low temperature is about 200° C.

The catalyst component downstream of the passive $NO_x$ adsorber is a SCR catalyst, a particulate filter, a SCR filter, a $NO_x$ adsorber catalyst, a three-way catalyst, an oxidation catalyst, or combinations thereof.

The following examples merely illustrate the invention. Those skilled in the art will recognize many variations that are within the spirit of the invention and scope of the claims.

Example 1: Preparation of Passive $NO_x$ Adsorbers (PNAs)

Palladium is added to a small pore chabazite (CHA) zeolite with a silica-to-alumina ratio (SAR) of 26, a medium pore ZSM-5 (MFI) zeolite with a SAR=23 and a large pore beta (BEA) zeolite with an SAR=26 to produce PNA 1A (Pd/CHA), Comparative PNA 1B (Pd/MFI) and Comparative PNA 1C (Pd/BEA) according to the following general procedure: The powder catalyst is prepared by wet impregnation of the zeolite using palladium nitrate as the precursor. After drying at 100° C., the samples are calcined at 500° C. The samples are then hydrothermally aged at 750° C. in an air atmosphere containing 10% $H_2O$. The Pd loading for all the three samples is 1 wt. %.

Comparative PNA 1D (Pd/$CeO_2$) is prepared following the procedures reported in WO 2008/047170. The Pd loading is 1 wt. %. The sample is hydrothermally aged at 750° C. in an air atmosphere containing 10% $H_2O$.

Example 2: $NO_x$ Storage Capacity Testing Procedures

The PNA (0.4 g) is held at an adsorption temperature about 80° C. for 2 minutes in an NO-containing gas mixture flowing at 2 liters per minute at a MHSV of 300 $L*hr^{-1}*g^{-1}$.

This adsorption stage is followed by Temperature Programmed Desorption (TPD) at a ramping rate of 10° C./minute in the presence of the NO-containing gas until the bed temperature reaches about 400° C. in order to purge the catalyst of all stored $NO_x$ for further testing. The test is then repeated starting from an adsorption temperature of 170° C., instead of 80° C.

The NO-containing gas mixture during both the adsorption and desorption comprises 12 vol. % $O_2$, 200 ppm NO, 5 vol. % $CO_2$, 200 ppm CO, 50 ppm $C_{10}H_{22}$, and 5 vol. % $H_2O$.

The $NO_x$ storage is calculated as the amount of $NO_2$ stored per liter of catalyst with reference to a monolith containing a catalyst loading of about 3 $g/in^3$. The results at the different temperatures are shown in Table 1.

The results at Table 1 show that the PNA of the invention (PNA 1A) demonstrates comparable $NO_x$ storage capacity both at 80 and 170° C. as compared to Comparative PNA 1D. Although Comparative PNAs 1B and 1C exhibit higher $NO_x$ storage capacity at 80° C., their $NO_x$ storage capacity at 170° C. is lower. For applications require high $NO_x$ storage capacity at temperatures above about 170° C., PNA 1A and Comparative PNA 1D show advantages over Comparative PNAs 1B and 1C.

Example 3: $NO_x$ Storage Capacity after Sulfur Exposure Testing Procedures

PNA 1A and Comparative PNA 1D were subjected to a high level of sulfation by contacting them with a $SO_2$ containing gas (100 ppm $SO_2$, 10% $O_2$, 5% $CO_2$ and $H_2O$, balance $N_2$) at 300° C. to add about 64 mg S per gram of catalyst. The $NO_x$ storage capacity of the catalysts before and after sulfation is measured at 100° C. following the procedures of Example 2. The results are listed in Table 2.

The results shown in Table 2 indicate that the PNA of the invention (PNA 1A) retains a significant amount of the $NO_x$ storage capacity even after high a level of sulfur exposure. In contrast, Comparative PNA 1D loses almost all of its $NO_x$ adsorption ability under the same sulfation conditions. The PNA of the invention exhibits much improved sulfur tolerance.

Example 4: Preparation of Small Pore Molecular Sieve Supported Passive $NO_x$ Adsorbers (PNAs)

Palladium is added to a series of small pore molecular sieves following the procedure of Example 1. The Pd loading is kept at 1 wt. % for all the samples. The samples are hydrothermally aged at 750° C. in an air atmosphere containing 10% $H_2O$.

The aged samples are then tested for their $NO_x$ storage capacities following the procedure of Example 2.

These PNAs and their $NO_x$ storage capacity at 80 and 170° C. are listed in Table 3.

The results in Table 3 show that a wide range of small pore molecular sieve supported PNAs have high $NO_x$ storage capacity.

Example 5: Preparation of Small Pore Molecular Sieve Supported Passive $NO_x$ Adsorbers (PNAs) with Different Palladium Loadings Palladium is added to a small pore molecular sieve CHA following the procedure of Example 1. The Pd loading is increased to 2 wt. % for the sample. The sample is hydrothermally aged at 750° C. in an air atmosphere containing 10% $H_2O$. The aged sample is tested for its $NO_x$ storage capacities following the procedure of Example 2. The $NO_x$ storage capacities at 80 and 170° C. on the sample are listed in Table 4.

The results in Table 4 show that increasing Pd loading increases the $NO_x$ storage capacity.

TABLE 1

$NO_x$ storage capacity (g $NO_2$/L)

| Catalyst | $NO_x$ storage capacity (80° C.) | $NO_x$ storage capacity (170° C.) |
| --- | --- | --- |
| 1A | 0.28 | 0.45 |
| 1B * | 0.35 | 0.28 |
| 1C * | 0.68 | 0.07 |
| 1D * | 0.29 | 0.38 |

* Comparative Example

TABLE 2

$NO_x$ storage capacity (g $NO_2$/L)

| | $NO_x$ storage capacity at 100° C. | |
| --- | --- | --- |
| Catalyst | Before Sulfation | After Sulfation |
| 1A | 0.41 | 0.28 |
| 1D * | 0.31 | 0.01 |

* Comparative Example

TABLE 3

$NO_x$ storage capacity (g $NO_2$/L)

| Catalyst | Small pore molecular sieve | $NO_x$ storage capacity (80° C.) | $NO_x$ storage capacity (170° C.) |
| --- | --- | --- | --- |
| PNA 1A | CHA (SAR = 26) | 0.28 | 0.45 |
| PNA 4A | CHA (SAR = 12) | 0.42 | 0.60 |
| PNA 4B | CHA (SAR = 13) | 0.34 | 0.51 |
| PNA 4C | CHA (SAR = 17) | 0.20 | 0.42 |
| PNA 4D | CHA (SAR = 22) | 0.28 | 0.42 |
| PNA 4E | AEI (SAR = 20) | 0.33 | 0.57 |
| PNA 4F | ERI (SAR = 12) | 0.08 | 0.2 |
| PNA 4G | CHA (SAPO-34) | 0.29 | 0.41 |
| PNA 4H | AEI-CHA Intergrowth (SAPO) | 0.22 | 0.23 |

TABLE 4

$NO_x$ storage capacity (g $NO_2$/L)

| Catalyst | Molecular sieve | Pd loading (wt. %) | $NO_x$ storage capacity (80° C.) | $NO_x$ storage capacity (170° C.) |
| --- | --- | --- | --- | --- |
| PNA 1A | CHA (SAR = 26) | 1 | 0.28 | 0.45 |
| PNA 5A | CHA (SAR = 26) | 2 | 0.43 | 0.66 |

We claim:

1. A passive $NO_x$ adsorber effective to adsorb $NO_x$ at or below a low temperature and release the adsorbed $NO_x$ at temperatures above the low temperature, said passive $NO_x$ adsorber comprising a noble metal and a small pore molecular sieve having a maximum ring size of eight tetrahedral atoms:

wherein greater than 5 percent of the total amount of noble metal is located inside pores of the small pore molecular sieve.

2. The passive $NO_x$ adsorber of claim 1 wherein the noble metal is selected from the group consisting of platinum, palladium, rhodium, gold, silver, iridium, ruthenium, osmium, and mixtures thereof.

3. The passive $NO_x$ adsorber of claim 1 wherein the noble metal is palladium.

4. The passive $NO_x$ adsorber of claim 1 wherein the small pore molecular sieve is selected from the group consisting of aluminosilicate molecular sieves, metal-substituted aluminosilicate molecular sieves, aluminophosphate molecular sieves and metal-substituted aluminophosphate molecular sieves.

5. The passive $NO_x$ adsorber of claim 1 wherein the small pore molecular sieve is selected from the group of Framework Type consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, and mixtures or intergrowths thereof.

6. The passive $NO_x$ adsorber of claim 1 wherein the small pore molecular sieve is selected from the group Framework Type consisting of AEI and CHA.

7. The passive $NO_x$ adsorber of claim 5 wherein the intergrowths of the small pore molecular sieves include KFI-SIV, ITE-RTH, AEW-UEI, AEI-CHA, and AEI-SAV.

8. The passive $NO_x$ adsorber of claim 1 wherein the passive $NO_x$ adsorber is coated onto a flow-through or filter substrate.

9. The passive $NO_x$ adsorber of claim 8 wherein the flow-through substrate is a honeycomb monolith.

10. The passive $NO_x$ adsorber of claim 1 wherein the passive $NO_x$ adsorber is extruded to form a flow-through or filter substrate.

11. The passive $NO_x$ adsorber of claim 1 wherein the low temperature is 200° C.

12. An exhaust system for internal combustion engines comprising the passive $NO_x$ adsorber of claim 1 and a catalyst component selected from the group consisting a selective catalytic reduction (SCR) catalyst, a particulate filter, a SCR filter, a $NO_x$ adsorber catalyst, a three-way catalyst, an oxidation catalyst, and combinations thereof.

13. A method for reducing $NO_x$ in an exhaust gas, said method comprising adsorbing $NO_x$ onto the passive $NO_x$ adsorber of claim 1 at or below a low temperature, thermally desorbing $NO_x$ from the passive $NO_x$ adsorber at a temperature above the low temperature, and catalytically removing the desorbed $NO_x$ on a catalyst component downstream of the passive $NO_x$ adsorber.

14. The method of claim 13 wherein the catalyst component is selected from the group consisting a selective catalytic reduction (SCR) catalyst, a particulate filter, a SCR filter, a $NO_x$ adsorber catalyst, a three-way catalyst, an oxidation catalyst, and combinations thereof.

15. The method of claim 14 wherein the low temperature is 200° C.

* * * * *